United States Patent [19]
Menon et al.

[11] Patent Number: 5,919,405
[45] Date of Patent: Jul. 6, 1999

[54] FLUID DISTRIBUTION SYSTEM FOR AN ABSORPTION TOWER

[75] Inventors: Adam V. Menon, Valley Park, Mo.; Thomas John Schnepf, Waterloo, Ill.; Rasik Jagjivandas Suthar, Creve Coeur, Mo.; Dennis Joseph Schamburg, Hillsboro, Mo.; Charles Nelson Carpenter, St. Louis, Mo.

[73] Assignee: Monsanto Company, St. Louis, Mo.

[21] Appl. No.: 08/956,707

[22] Filed: Oct. 23, 1997

[51] Int. Cl.$^6$ .................................................. B01D 47/14
[52] U.S. Cl. ...................................... 261/97; 261/DIG. 44
[58] Field of Search ..................... 261/97, 110, DIG. 44; 239/586

[56] References Cited

U.S. PATENT DOCUMENTS

| | | | |
|---|---|---|---|
| 1,848,948 | 3/1932 | Grosser | 239/586 |
| 3,146,609 | 9/1964 | Engalitcheff, Jr. | 261/97 |
| 4,267,978 | 5/1981 | Manteufel | 261/97 |
| 4,479,909 | 10/1984 | Streuber | 261/97 |

FOREIGN PATENT DOCUMENTS

561047502  10/1983  Russian Federation ................. 261/97

OTHER PUBLICATIONS

Enviro–Chem Systems, A Monsanto Company; Engineered Alloy Products "News Notes"; vol. 1, Edition 2; entitled "Acid Distribution Systems —Solutions from Enviro–Chem Systems"; dated Jul. 1996; pp. 1–3.

Nick Bhambri & John Horne; Monsanto Enviro–Chem Systems, Inc.; entitled "Corrosion Resistant Alloys in Sulfuric Acid Combining Corrosion Technology with Design"; dated May, 1996; front cover with pp. 1–12.

Enviro–Chem Systems brochure; entitled "Acid Distributors"; undated; 2 pages (two sided).

*Primary Examiner*—Jay H. Woo
*Assistant Examiner*—Robert Hopkins
*Attorney, Agent, or Firm*—Senniger, Powers, Leavitt & Roedel

[57] ABSTRACT

A fluid distribution system for a packed absorption tower. The system includes one or more troughs mounted in the tower above the packing. Fluid enters each trough through an inlet in a side wall of the trough for flow to one or more orifices through which the fluid passes to fill the trough. Fluid is directed to the orifices by a conduit defined by the bottom and side walls of the trough and by a partition extending between the side walls above the inlet. Downtubes on each trough extend from inside the trough down through the bottom wall of the trough to a location below the trough. Each downtube has an inlet disposed inside the trough. Fluid passes through the orifices to fill the trough to a level sufficient for fluid to enter the inlets of the downtubes and to flow down the downtubes for distribution on the packing.

16 Claims, 9 Drawing Sheets

FLUID DISTRIBUTION SYSTEM FOR AN ABSORPTION TOWER

BACKGROUND OF THE INVENTION

This invention relates generally to packed absorption towers and, more particularly, to a packed absorption tower with an improved system for distributing fluid over the packing in the tower.

In so-called "gas absorption" operations, soluble portions of a gas mixture are dissolved in a liquid. Typically, gas absorption is conducted in a vertical gas/liquid contact zone such as a packed tower or tray tower. Packed towers are the most common.

A packed tower is filled with a bed of packing material which may be dumped randomly or arranged in "structured" fashion. The bed of packing is permeable to gas and liquid flow, and provides surface area for intimate gas/liquid contact and consequent mass transfer of soluble components of the gas to the liquid phase. In a countercurrent system (the most common type), the absorbing liquid is introduced into the top of the tower, and the rich gas is introduced into the bottom of the tower; enriched liquid exits the bottom of the tower, and lean gas exits the top of the tower.

For example, in the manufacture of sulfuric acid, a combustion gas containing sulfur dioxide is produced by burning sulfur in excess air, and sulfur dioxide in the combustion gas is converted to sulfur trioxide by passage of the gas over a catalyst. Sulfur trioxide is removed from this "converter" gas by absorption in sulfuric acid. Sulfuric acid, having a concentration of 98.3%, for example, is introduced into the top of the absorption tower and percolates downwardly through the packing. Sulfur trioxide laden gas enters the bottom of the tower and flows upwardly through the packing where it contacts the downward flowing acid. Sulfur trioxide is transferred from the gas to the liquid phase, reacting with water to form additional sulfuric acid. The acid exits the bottom of the tower at a concentration of, e.g., 99.2%. This acid stream is cooled in a heat exchanger (to remove substantial heat of absorption) and a portion of the cooled acid is removed from the system as product, while the bulk of the cooled acid is diluted with water back to 98.3% and recirculated to the top of the absorption tower. Gas leaving the top of the tower is directed to the stack or to other steps in the process.

To assure effective mass transfer, and especially to prevent channeling of sulfur trioxide laden gas through the tower without adequate contact with the liquid, it is important to assure that the acid entering the tower is evenly distributed over the packing. This way the packing is uniformly wetted with the downflowing liquid, and there is a uniform axial (vertical) acid concentration gradient, with little or no radial (horizontal) acid concentration gradient, throughout the tower. This provides maximum driving force for mass transfer and minimizes channeling.

The most traditional systems for distributing fluid over packing are pipe-type systems and trough-type systems, the latter of which comprise a series of troughs having downtubes (sometimes referred to as "downcomers") which deliver fluid from the troughs to the packing. Trough-type systems have many advantages over pipe-type systems, but they require a network of overhead piping to distribute fluid to the various troughs of the system. This network is expensive to manufacture and install.

SUMMARY OF THE INVENTION

Among the several objects of this invention may be noted the provision of an improved trough-type fluid distribution system which eliminates the need for a network of overhead feeder piping to the troughs; the provision of an absorption tower which uses such a fluid distribution system; the provision of such a system which effects the uniform distribution of fluid to the packing for complete wetting of the packing and uniform flow of fluid down through the packing; and the provision of such a system which is economical to manufacture and easy to install.

Briefly, a fluid distribution system of this invention comprises one or more troughs adapted to be mounted in a packed absorption tower above the packing. Each trough has a bottom wall and a pair of spaced apart side walls. An inlet is provided in a side wall of the trough for flow of fluid into the trough. Ducting conveys fluid to the inlet of the trough to fill the trough with fluid. A flow control system on the inside of the trough adjacent the inlet defines one or more orifices through which fluid may pass to fill the trough. A partition extends between the side walls of the trough above the inlet of the trough, the bottom and side walls of the trough combining with the partition to define a conduit for directing the flow of fluid entering the trough to said one or more orifices of the flow control system. A series of downtubes on each trough extend from inside the trough down through the bottom wall of the trough to a location below the trough. Each downtube has an inlet disposed inside the trough and an outlet below the trough. The arrangement is such that fluid is adapted to fill the trough to a level sufficient for fluid to enter the inlets of the downtubes and flow down the downtubes to the outlets for distribution on the packing.

This invention is also directed to an absorption tower having the fluid distribution system described above.

Other objects and features will be in part apparent and in part pointed out hereinafter.

BRIEF DESCRIPTION OF THE DRAWINGS

Corresponding parts are designated by corresponding reference numerals throughout the several views of the drawings.

DESCRIPTION OF THE PREFERRED EMBODIMENT

Figure 1:
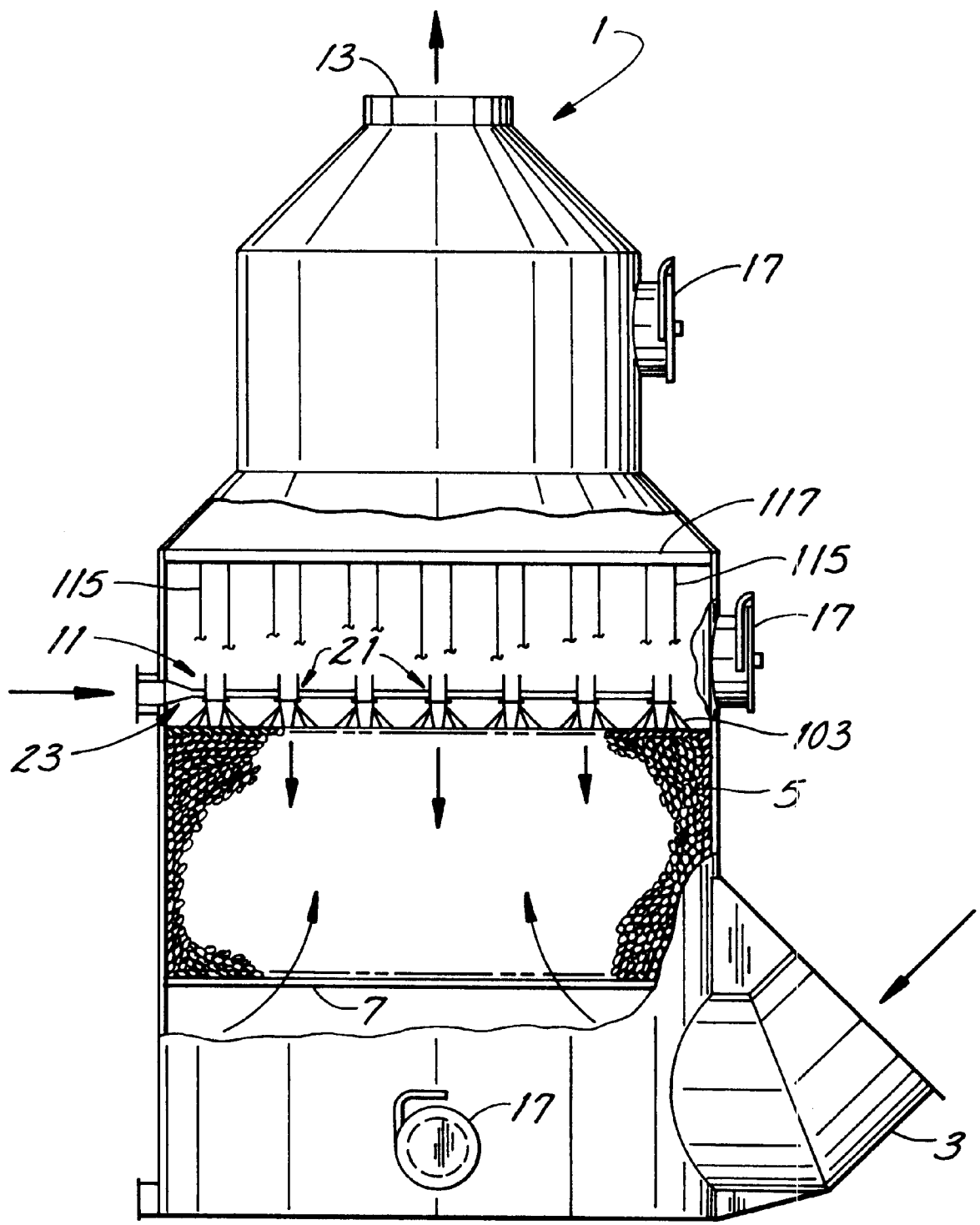
FIG. 1 is an absorption tower having a fluid distribution system of the present invention.

Referring now to the drawings, and first more particularly to FIG. 1, a gas absorption tower is generally indicated at 1. The tower has a gas inlet 3 for inflow of gas (e.g., a combustion gas containing sulfur dioxide) into the tower, and packing 5 inside the tower supported by a grate 7, the arrangement being such that the gas flows in an upward direction through the grate and the packing. A fluid distribution system made in accordance with this invention and generally designated by the reference numeral 11, is mounted in the tower over the packing for distributing fluid (e.g., liquid sulfuric acid) over the packing for flow of the fluid down through the packing countercurrent to the upward flow of gas. A gas outlet 13 is provided at the top of the tower for exit of gas from the tower. Manways 17 are provided for access to the interior of the tower.

As shown best in FIG. 1, the fluid distribution system comprises a series of horizontal troughs 21 mounted in the tower over the packing 5, and ducting generally indicated at 23 for conveying fluid from a suitable source (not shown) outside the tower to the troughs. Conveyance of the fluid to the troughs may be in series, that is, sequentially from one trough to the next. It will be understood that the number of troughs can vary from one to many depending on various factors, including the size of the tower and the volume of liquid to be distributed. In FIG. 1, for example, the system is shown as including seven troughs.

Figure 2:
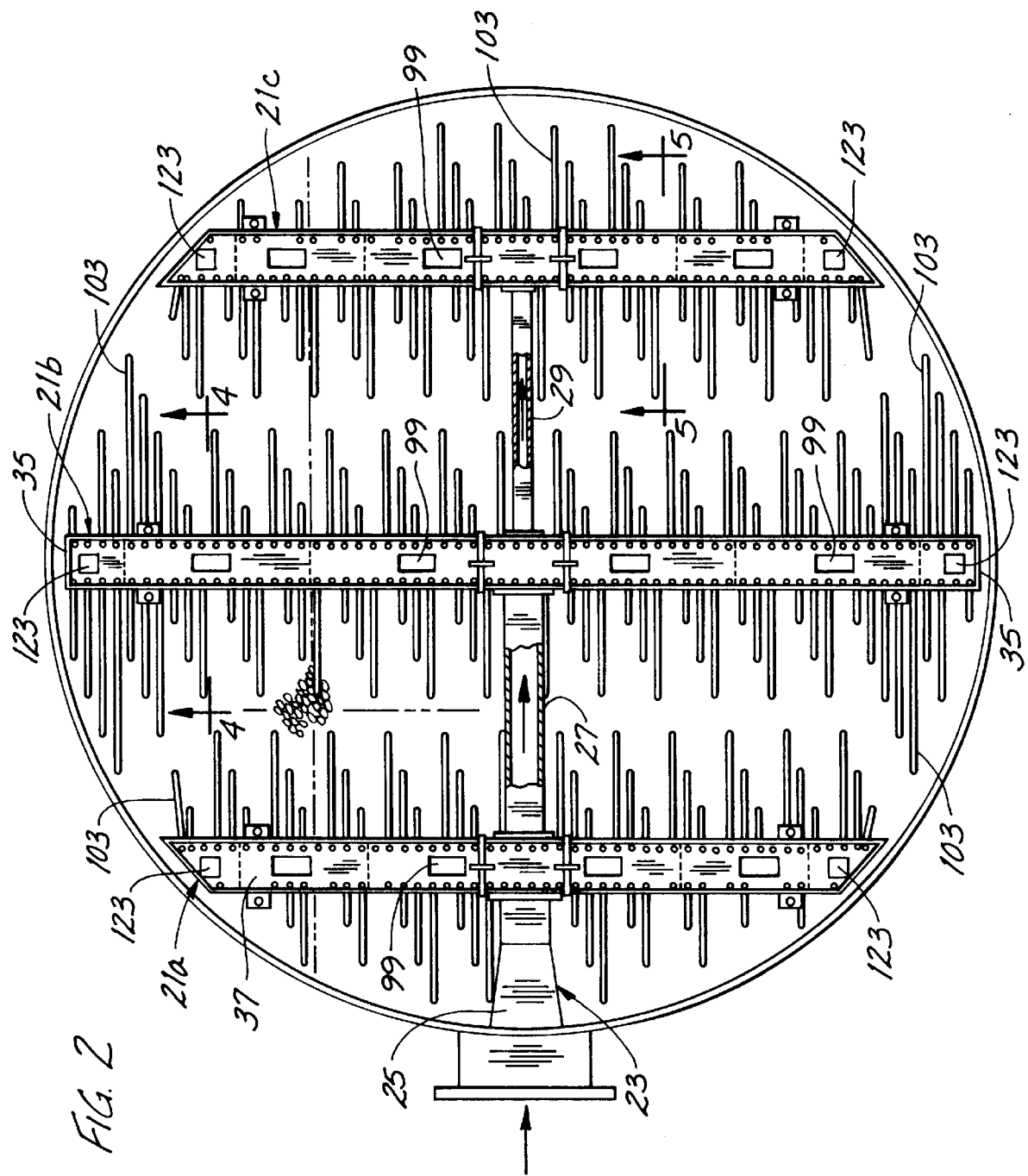
FIG. 2 is a plan of a simplified fluid distribution system having only three troughs.

FIG. 2 shows a simplified system having only three troughs, 21a, 21b, and 21c. It will be understood that most systems will have more than three troughs, but the number is reduced in FIG. 2 for ease of description. The FIG. 2 system includes a first duct 25 for conveyance of fluid to the first trough 21a, a second duct 27 for conveyance of fluid to the second trough 21b, and a third duct 29 for conveyance of fluid to the third trough 21c. This arrangement provides for sequential filling of the troughs. However, other arrangements are also contemplated. For example, each trough may be connected directly to the fluid source for flow of fluid directly to the trough. Alternatively, the troughs may be divided into different groups, with only the troughs in each group being connected in series.

The construction of the troughs 21 is best shown in FIGS. 3–6. Each trough 21 has a bottom wall 31, a pair of spaced apart generally parallel side walls 33, end walls 35 at opposite ends of the trough, and a horizontal partition 37 extending between the side walls of the trough. In one embodiment, the partition extends the full length of the trough from one end wall 35 to the other. The partition 37 is spaced above the bottom wall 31 of the trough to divide the trough into an upper chamber 43 above the partition and a lower chamber 45 below the partition. As will be explained in more detail below, one of the functions of this partition is to minimize waves and turbulence in the trough to provide a more uniform distribution of fluid onto the packing. The partition may be a steel plate, for example, supported by horizontal bars 47 spanning the side walls 33 of the trough at intervals along the trough. The trough and bars are preferably also of metal. The partition may be a single plate or fabricated from multiple plates.

Figure 3:
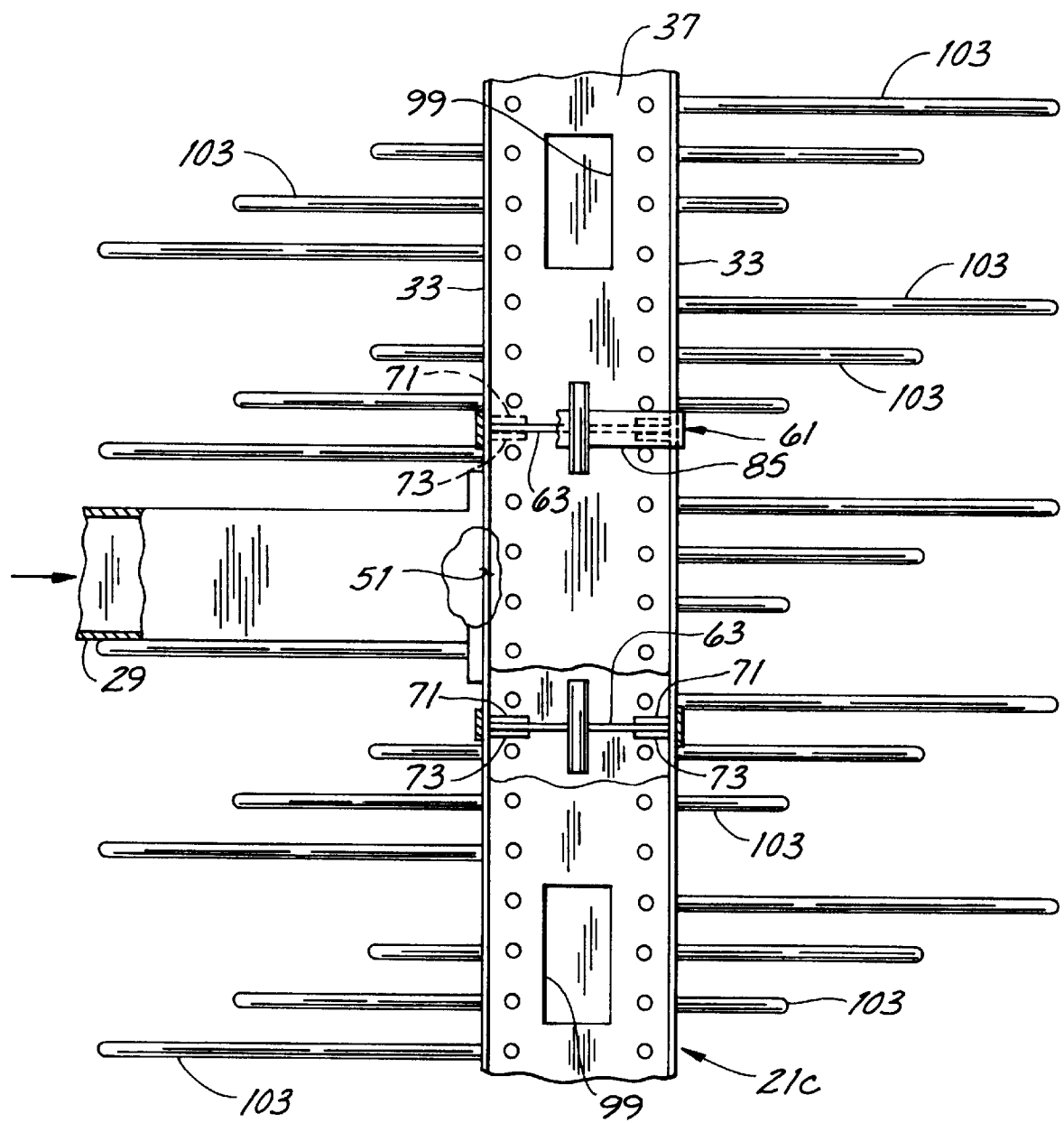
FIG. 3. is an enlarged part of FIG. 2 showing the construction of a trough, parts being broken away to illustrate details.
Figure 6:
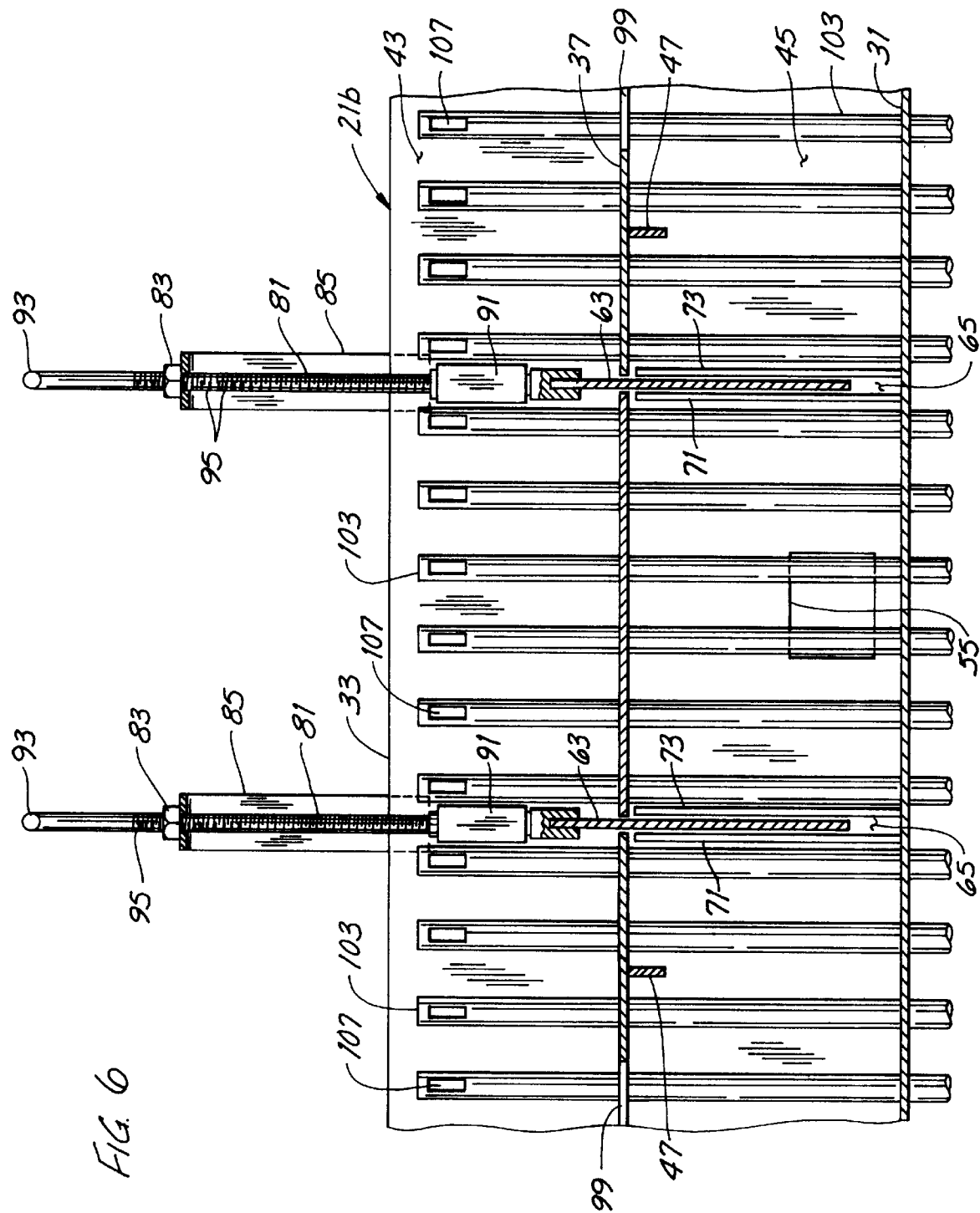
FIG. 6 is a vertical section taken in the planes of 6—6 of FIG. 5.

Each trough has an inlet comprising an opening 51 in the side wall 33 of the trough 21 closest the tower inlet (see FIG. 3.) This opening communicates with the duct (29 in FIG. 3) which feeds fluid to the trough. Further, each trough except the last one in the series of troughs has an outlet in the form of an outlet opening 55 (FIG. 6.) This opening 55 communicates with a respective duct for carrying fluid to the next trough in the series of troughs. The inlet and outlet openings 51, 55 are preferably located directly across from one another approximately midway between the ends of the trough, but this location may vary. Also, it is contemplated that a trough may be fed by more than one duct, in which case multiple inlet openings and multiple outlet openings in the same trough may be required. These openings should be sized and located to ensure even and adequate distribution of fluid to the troughs. In any case, the inlet and outlet openings of a trough are located entirely below the partition 37 so that fluid flows into the lower chamber 45 (and not directly into the upper chamber 43) of each trough.

A flow control system, generally indicated at 61, is provided for controlling the flow of fluid into each trough 21. More particularly, this system is illustrated in FIG. 3 as comprising a gate mechanism which includes a pair of spaced apart gates, each designated 63, extending across the inside of each trough on opposite sides of the inlet opening 51 of the trough. (For a trough having an outlet opening 55, the gates 63 are on opposite sides of this opening as well.) Each gate comprises a solid (i.e., unperforated) rectangular metal plate mounted on the trough 21 for sliding movement in a generally vertical plane through a slot (or gap) in the partition 37. The gate is moveable from a position in which its bottom edge is in contact with the bottom wall 31 of the trough to prevent substantial flow therepast, to a position in which the bottom edge of the gate is spaced above the bottom wall of the trough (FIGS. 5 and 6) to define an opening or orifice 65 through which fluid may pass into the lower chamber 45 to fill the trough. The gate is mounted for such movement between two pairs of vertical guide strips 71,73 on opposite sides of the gate. The guide strips 71, 73 are suitably secured (e.g., welded) in fixed position to the side walls 33 of the trough. Alternatively, one pair of guide strips (71 or 73) could be replaced by a fixed baffle plate having suitable openings in it. The purpose of the baffle plate would be to further calm and smooth the flow of fluid as it rushes beneath the gate into the trough. It is also contemplated that the flow control system may take other forms. For example, the gate may be a stationary plate reaching down to the bottom wall 31 of the trough and having one or more openings (orifices) in it. These openings may be of fixed size, or adjustable in size. Also, the number of gates per trough may vary from a single gate, if the inlet 51 of the trough is adjacent an end wall 35 of the trough, to more than two gates, depending on how many inlets 51 the trough may have.

Figure 5:
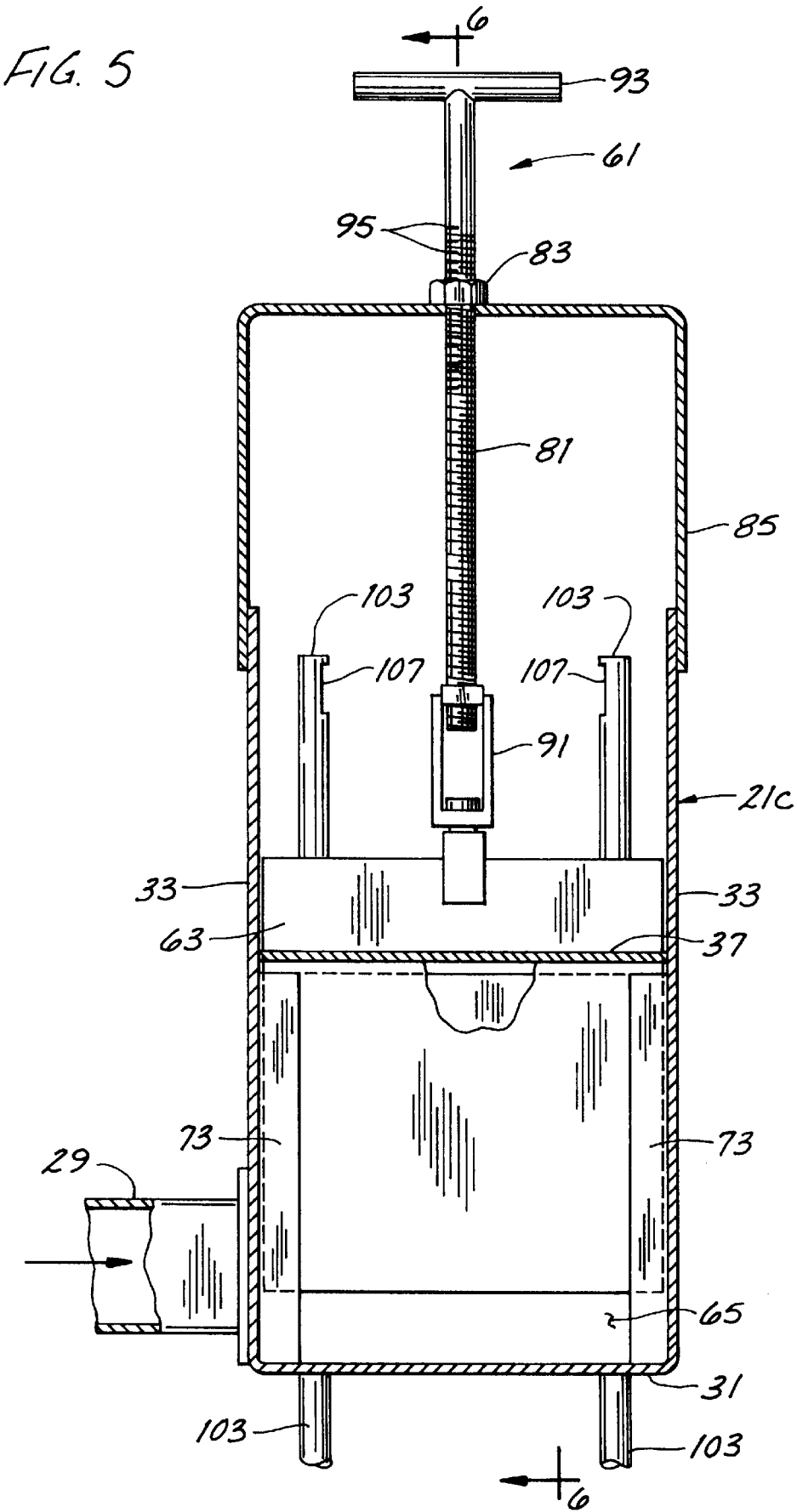
FIG. 5 is an enlarged vertical section taken in the plane of 5—5 of FIG. 2 showing flow control means in the trough.

The vertical position of each gate 63 is preferably adjustable to vary the size of the orifice 65 through which the fluid flows into the lower chamber 45. This is accomplished by means of a threaded vertical shaft 81 threadably engageable with a nut 83 carried by a bracket 85 of inverted-U shape connected to the side walls 33 of the trough, as shown in FIGS. 5 and 6. The lower end of the shaft 81 is rotatably (but not threadably) attached to a turnbuckle-type connector 91 affixed to the gate, the arrangement being such the shaft may be turned in one direction to lower the gate (and thus decrease the size of the orifice 65) and in the opposite direction to raise the gate (and thus increase the size of the orifice 65). A T-handle 93 is provided at the upper end of the shaft to facilitate rotation of the shaft, and suitable markings 95 are applied along the shaft to indicate the height of the orifice made by the gate. It will be understood that different mechanisms may be used to raise and lower the gate without departing from the scope of this invention.

Referring again to FIG. 3, the partition 37 in each trough 21 has a series of openings 99 in it spaced at intervals along the trough. These openings provide fluid communication between the upper and lower chambers 43, 45 of the trough. When the lower chamber is filled, fluid passes through the openings 99 in the partition to fill the upper chamber. These openings should be sized and located to balance the flow of fluid to the upper chamber so that it fills evenly along the entire length of the trough. While the shape of the openings is depicted in the drawings as rectangular, this shape may vary. The number of openings may also vary. The openings may also be provided by providing gaps between the plates making up the partition and/or gaps between such plates and one or both end walls of the trough.

A series of conventional downtubes 103 (sometimes referred to as "downcomers") are mounted inside each trough 21 to extend from the upper chamber 43 of the trough down through holes in the partition 37 and the bottom wall 31 of the trough to a location below the trough. Each downtube has an inlet (e.g., a slot 107 formed in the tube) adjacent its upper end which is disposed in the upper chamber of the trough a predetermined distance above the partition for entry of fluid from the upper chamber into the downtube. The lower end of the downtube 103 is open to provide an outlet 111 for delivery of fluid to the packing. The downtubes in each trough are preferably (but not necessarily) arranged in two parallel rows along opposite side walls of the trough. The upper parts of the downtubes are generally straight and vertical; the lower parts are bent at various angles to ensure uniform distribution of fluid over the packing. The downtubes are affixed to the trough in any suitable manner, as by welding to the bottom wall of the trough.

Figure 4:
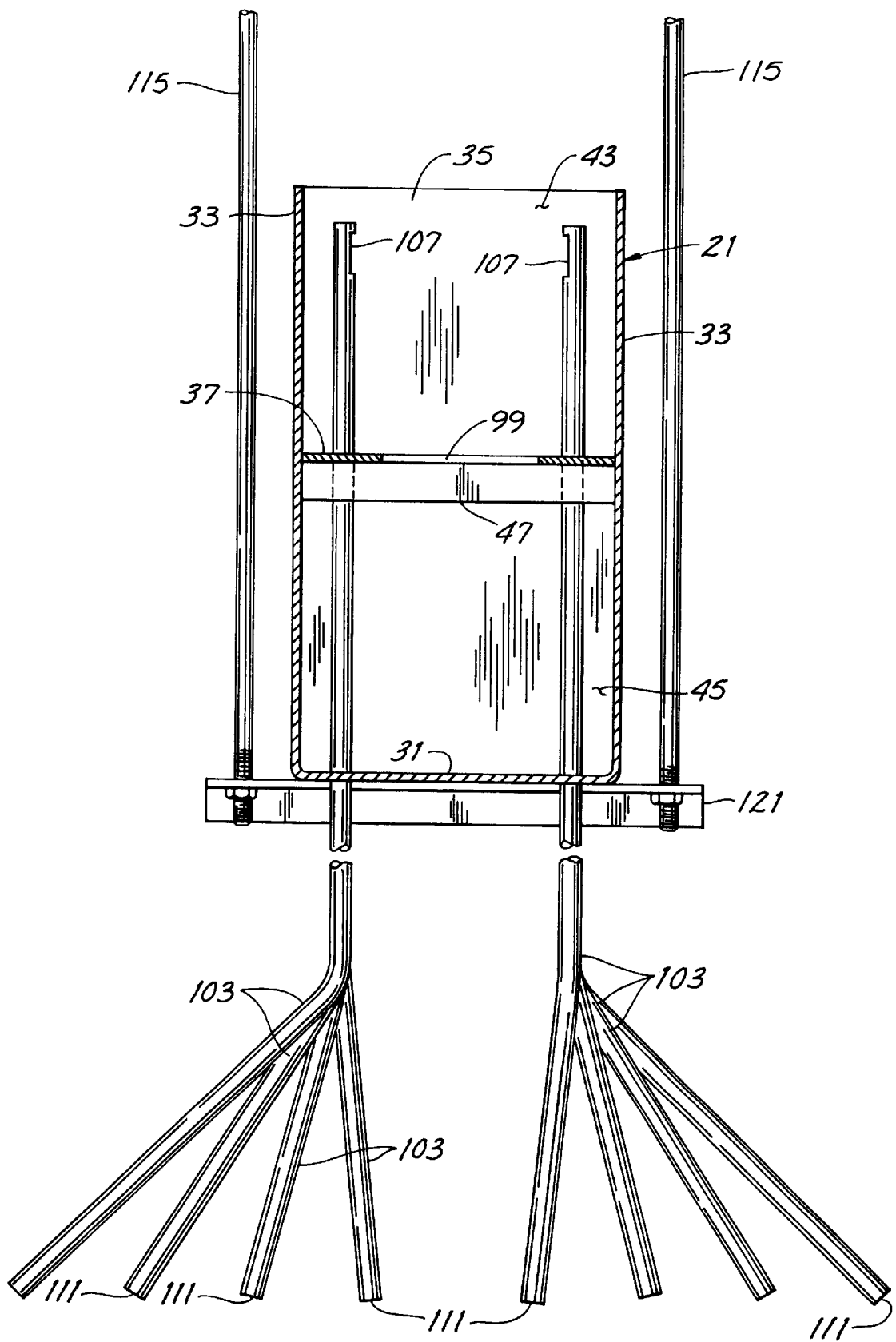
FIG. 4 is an enlarged vertical section taken in the plane of 4—4 of FIG. 2.

The troughs are supported by threaded rods 115 suspended from suitable structure 117 in the tower (see FIG. 1). These rods are connected at their lower ends to angle supports 121 underlying each trough, as shown in FIG. 4. Drain openings closed by removable covers or plugs 123 are provided at opposite ends of each trough 21 for draining the troughs when necessary, as for cleaning or other maintenance (see FIG. 2.)

The operation of the fluid delivery system shown in FIG. 2 will now be described. Fluid introduced into the system flows through the first duct 25 to the inlet 51 of the first trough 21a, where it flows into the lower chamber 45 of the inlet section of the trough. Fluid entering the trough is contained within the lower chamber 45 of the inlet section defined by the bottom and side walls 31, 33 of the trough and by the partition 37, all of which combine to form a conduit which directs the fluid to and through the orifices 65 defined by the two gates 63 on opposite sides of the inlet. During this inflow, the partition 37 minimizes the waves and turbulence in the upper chamber. After the lower chamber has filled, fluid flows up through the openings 99 in the partition to fill the upper chamber 43 to a level where the fluid enters the downtubes 103 and gravitates down the tubes for distribution over the packing in the tower. The openings 99 in the partition are sized and located to ensure a substantially uniform filling of the upper chamber along the entire length of the trough. While this is happening, some fluid entering the first trough 21a will exit the outlet 55 in the trough and flow to the second trough 21b in the series, where the sequence is repeated until all the troughs in the series are filled. After a period of time, all troughs should fill to a relatively constant level where the inlets 107 of all downtubes are partially submerged so that fluid is delivered at a substantially uniform rate over all areas of the packing. The partitions 37 functions during this steady-state condition to continue to minimize any waves and turbulence in the troughs so that the upper surfaces of the fluid in the troughs remain generally smooth, calm and at a substantially constant levels, thus ensuring a uniform flow of fluid into all downtubes.

The flow between the troughs is controlled by adjusting the position of the gates 63 to vary the sizes of the orifices 65.

Figure 7:
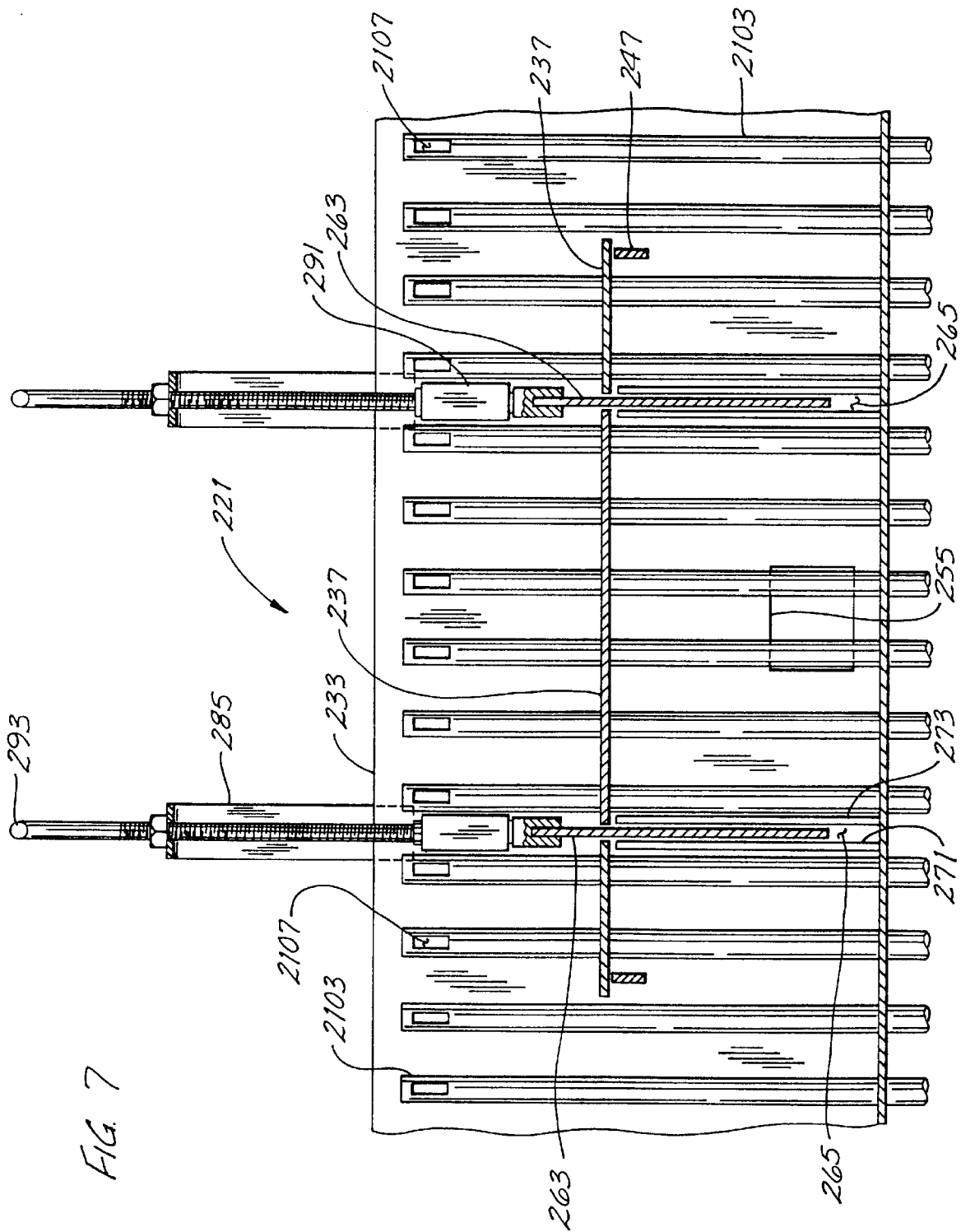
FIG. 7 is a view similar to FIG. 6 showing an alternate embodiment.

FIG. 7 illustrates a trough 221 which is similar to trough 21, and corresponding parts are designated by corresponding reference numerals preceded by the numeral "2". Trough 221 is different in that the partition 237 does not extend the full length of the trough. Instead, it extends only somewhat past each gate 263. This design is suitable for smaller applications where fluid turbulence is less of a concern, at least toward the ends of the trough. It will be understood in this regard that the partition 237 should extend above the trough inlet area (i.e., the area adjacent inlet 255) so that fluid entering the trough is contained and directed to and through the orifices 265. However, the extent to which the partition extend beyond the gates toward respective ends of the trough may vary.

EXAMPLE

Set forth below is design information relating to an exemplary fluid distribution system of the present invention.

Figure 8:
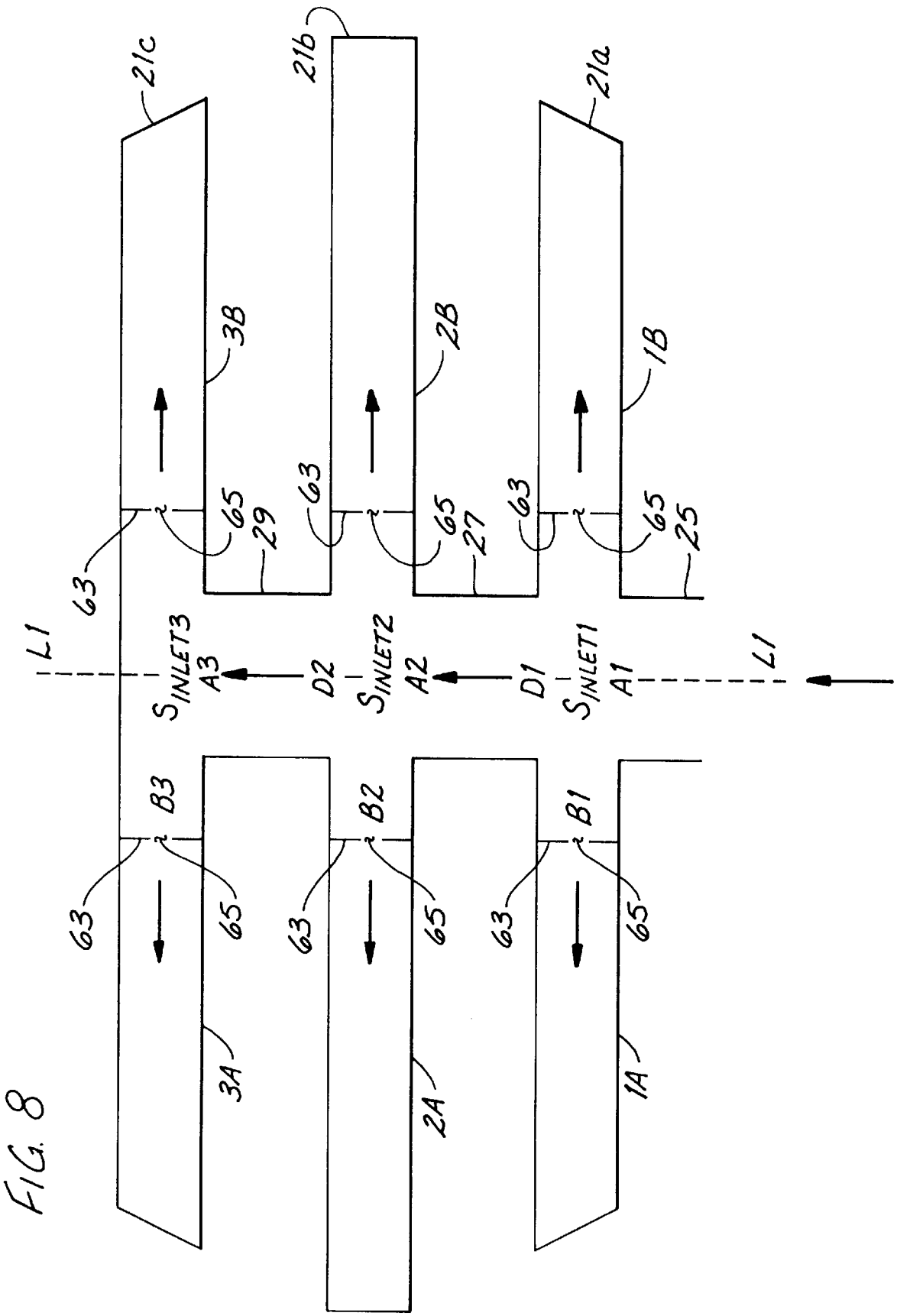
FIG. 8 is a schematic view illustrating the flow characteristics of the system shown in FIG. 2.

Assume that the system shown in FIG. 8 is to be used to distribute liquid to the packing in a 20-foot diameter tower at an overall rate of 1955.2 gallons per minute (gpm), with fluid distribution being uniform over the entire cross sectional area of the tower. Assume further that the center trough 21b has a length of about 12 feet, and that each of the two end troughs has 21a and 21c has a length of 9 feet. Assume further that trough 21b has 172 downtubes (24 between the two gates 63 in the trough; and 74 in each branch between gate 63 and the closest end of the trough); and that each of the troughs 21a and 21c has 122 downtubes (24 between the two gates 63 and 49 in each branch between the respective gate and the closest end of the trough). Since the total flow to the system is 1955.2 gpm and the flow is equally distributed, the flow to each downtube will be 4.7 gpm. Assume each trough has a width of 8 inches, and that the height between the partition plate and the bottom of the trough is 8 inches, and that the length of ducts 27 and 29 is 3.5 feet. Assume the fluid to be water for simplicity.

Step 1: Determine the required flow to each section of the trough.

Required flow to branches 1A, 1B, 3A, 3B=49×4.7=230.3 gpm each.

Required flow to branches 2A and 2B=74×4.7=347.8 gpm each.

Required flow to sections $S_{inlet1}$, $S_{inlet2}$, $S_{inlet3}$=24×4.7= 112.8 gpm each.

Since the system is symmetrical with respect to line L1—L1 through the center of the duct 27, only one half needs to be considered. For this example only the left side with trough sections 1A, 2A and 3A is considered.

Step 2: Determine the height of orifice 65 and the areas of openings 99 in FIG. 9.

Assume the inlet opening 51 at A1 to be 0.5 ft high and 1.5 ft wide.

$$V=Q/(448.83\times A) \qquad \text{Eq. (1)}$$

where V is the velocity in feet per second, Q is the flow rate in gpm and A is the cross sectional area of opening 51 in square feet.

$V_{A1}$=1955.2/(448.83×0.5×1.5)=5.8 ft/sec.

Assume pressure at A1, $P_{A1}$=1.5 psi

Using Bernoulli's energy balance;

$$E=P+\rho V^2/(2g_c\times 144)\text{psi} \qquad \text{Eq. (2)}$$

where $g_c$ is the acceleration due to gravity, $\rho$ is the density, E is the energy, P is the pressure and V is the velocity at a given location.

Energy at point A1, $E_{A1}$=1.7265 psi

Flow through orifice 65 in 1A=230.3+(112.8/2)=286.7 gpm

Cross sectional area at B1 under the partition plate 37=0.444 ft$^2$

From Eq. (1), velocity at B1, $V_{B1}$=1.44 ft/sec.

Energy loss due to change in direction from A1 to B1 and change of velocity is $$\Delta E_{B1} = [1.34 + (V_{B1}/V_{A1})^2] \times [(V_{A1}^2/2\ g_c]/144\ \text{psi} \qquad \text{Eq. (3)}$$

=0.3175 psi

Energy at B1
$E_{B1}=E_{A1}-\Delta E_{B1}$
=1.409 psi $$P = E - [\rho V^2/2\ g_c]/144\ \text{psi} \qquad \text{Eq. (4)}$$

where P is the pressure, E is the energy and V is the velocity at a given location.

From Eq. (4), pressure at B1, $P_{B1}$=1.395 psi

With consideration to erosion of the orifice material and overall pressure drop for the system, choose an optimum velocity through the orifice 65. For this example the velocity through the orifice 65 is set to 7 feet per second.

i.e., $V_{1A,65}$=7 ft/sec.

From Eq. (1), the required cross sectional area of orifice 65=0.077 ft$^2$.

Since the width of the orifice is 8 inches, the height of the orifice is 1.386 inches.

Applying Bernoulli's energy equation $$P_{B1} + [\rho V_{B1}^2/(2\ g_c \times 144)] = P_{1A,65} + [\rho V_{1A,65}^2/(2\ g_c \times 144)] \qquad \text{Eq. (5)}$$

Solving Eq. (5), pressure at orifice, $P_{1A,65}$=1.079 psi

Since there is no change in cross sectional area before and after the orifice 65, velocity in trough section 1A $V_{1A}=V_{B1}$=1.44 ft/sec.

Permanent head loss through orifice 65 is calculated from correlation in page 136 of "Handbook of Hydraulic Resistance" by Idel'chik, I. E.

Permanent head loss through orifice 65, $\Delta E_{\phi 1}$=0.68 psi

Energy of fluid after the orifice 65, $$E_{1A} = E_{B1} - \Delta E_{\phi 1} \qquad \text{Eq. (6)}$$

=0.729 psi

From Eq. (4), pressure after the orifice 65
$P_{1A}$=0.7151 psi

Figure 9:
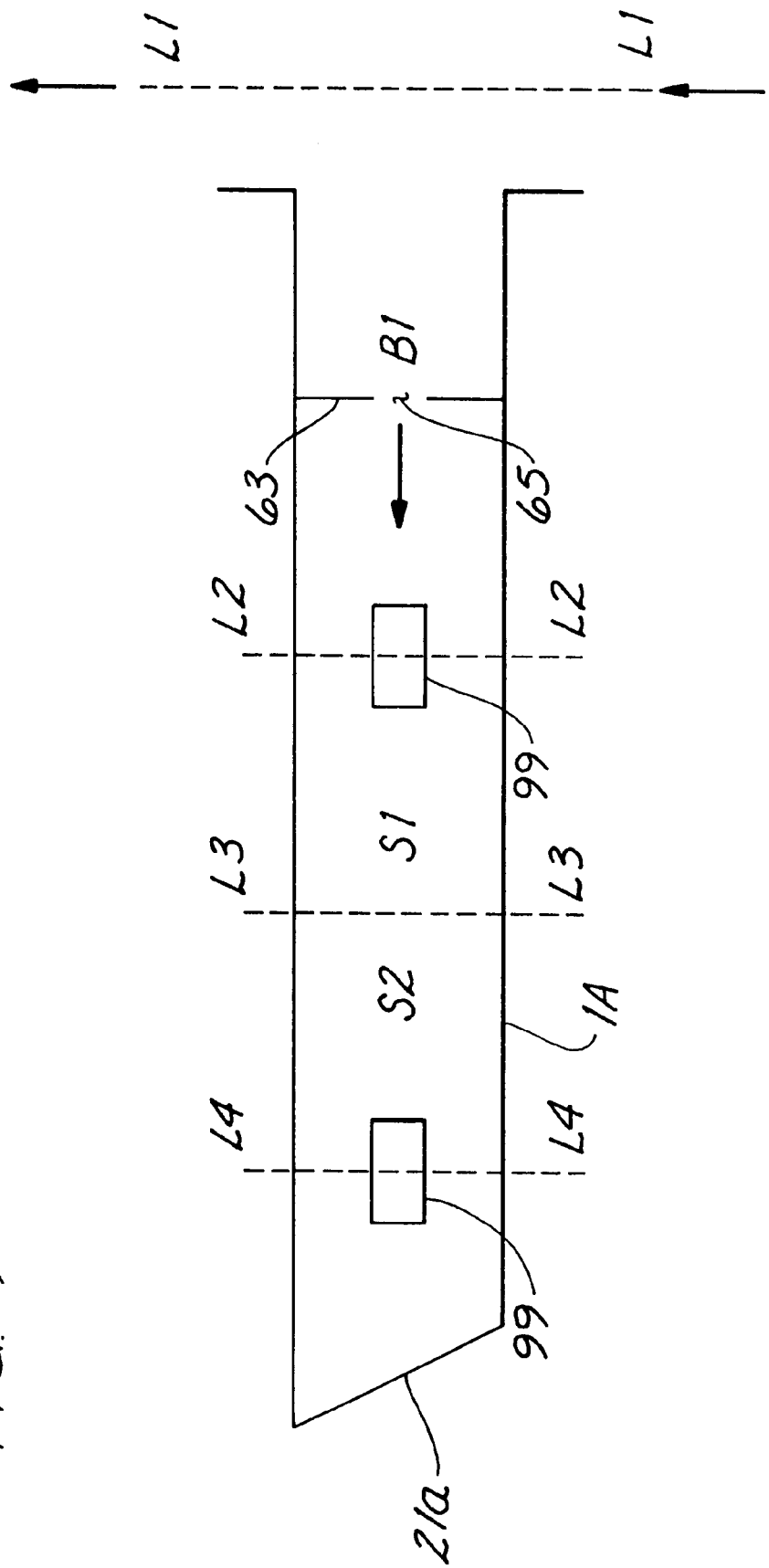
FIG. 9 is another schematic view showing additional flow characteristics of the system shown in FIG. 2.

For purpose of calculation divide the trough branch lengths into sections of arbitrary length as shown in FIG. 9. For this example trough branch 1A is divided at line L3—L3 into two sections S1 and S2. Section S1 has 24 downtubes and section S2 has 25 downtubes.

In FIG. 9, line L2—L2, the centerline of section S1 is 10.5 inches from orifice 65 in trough branch 1A.

$$\text{Reynolds number, } Re = 3600\ \rho V D_h/(2.42\mu) \qquad \text{Eq. (7)}$$

where $D_h$ is the hydraulic diameter, $\mu$ is the viscosity of the fluid, $\rho$ is the density and V is the velocity.

Hydraulic diameter, $D_h$=4×Area/wetted perimeter
=0.667 ft.

From Eq. (7) Reynolds number for flow between orifice 65 and line L2—L2, $Re_{L2}$=89,076.

For 2100<Re<100,000
Friction factor, $$f_{L2} = 0.316/Re^{1/4} \qquad \text{Eq. (8)}$$

=0.01829

$$E = f[\rho V^2/2 g_c][L/D_h] \qquad \text{Eq. (9)}$$

where E is the energy loss from friction, f is the friction factor, L is the length of the channel.

From Eq. (9), Energy loss from friction, $E_{loss2}$=0.000334 psi.

Energy of fluid at line L2—L2 is
$E_{L2}=E_{1A}-E_{loss2}$
=0.7287 psi

From Eq. (4), pressure at line L2—L2, $P_{L2}$=0.7148 psi

The required flow through the opening 99 at L2—L2 is 169.2 gpm (112.8 gpm for the 24 downtubes in section S1 and 56.4 gpm for the 12 downtubes in the inlet section $S_{inlet1}$).

Since the partition plate is 8 inches from the bottom of the trough

Pressure at bottom of plate=$P_{L2}$-head loss due to 8 inches of water column
=0.4268 psi Head above plate due to 4" of water column=0.144 psi $\Delta P$ across the opening 99 at L2—L2=0.4268-0.144=0.2828 psi Flow through opening
$$99 = 448.83\ C_D\ A\ (2 \times g_c \Delta P \times 144/\rho)^{1/2} \qquad \text{Eq. (10)}$$

where $C_D$ is the coefficient of discharge, A is the area of the opening and $\Delta P$ is the pressure difference across the opening.

From Eq. (10) the area of the opening 99 at L2—L2 is calculated.

Line L4—L4, the centerline of section S2 is 31.5 inches from orifice 65 in trough branch 1A.

Remaining flow from line L2—L2 to line L4—L4=25×4.7=117.5 gpm.

Applying Equations (7), (8), (9) and (10) the area of the opening 99 in section S2 at line L4—L4 is also calculated.

The calculations for trough branch 1B would be identical.

Step 3: Calculate the pressure at A2 in FIG. 8.

Assume the duct 27 is 0.5 feet high and 1.5 feet wide.

Cross sectional area at D1=0.75 ft$^2$

Flow through duct 27 is 1381.8 gpm (total flow less flow for branches 1A, 1B and section $S_{inlet}$).

From Eq. (1), velocity at D1, $V_{D1}$=4.1 ft/sec.

Energy loss from exit at A1 and entrance at D1

$$\Delta E_{D1} = [1 + 0.4(1-(V_{D1}/V_{A1})^2][\rho V_{A1}^2/2\ g_c]/144 \qquad \text{Eq. (11)}$$

=0.2719 psi

Energy at D1, $E_{D1}=E_{A1}-\Delta E_{D1}$
=1.4546 psi

From Eq. (4) pressure at D1, $P_{D1}$=1.3415 psi

From Eq. (7), $Re_{D1}$=284,441

For Reynolds number $Re_{D1}$>100,000

$$1/(f^{1/2}) = 2 \log Re\ (f^{1/2}) - 0.8 \qquad \text{Eq. (12)}$$

where f is the friction factor and Re is the Reynolds number.

Solving Eq. (12) by trial and error, friction factor for duct 27
$f_{27}$=0.0146

From Eq. (9), friction loss in duct 27, $E_{loss27}$=0.0072 psi

Energy at A2, $E_{A2}=E_{D1}-E_{loss27}$
=1.4474 psi

From Eq. (4), pressure at A2, $P_{A2}$=1.3343 psi

Repeat step 2 to calculate the height of the orifice 65 and areas of openings 99 in trough branches 2A and 2B.

Using step 3, find the pressure $P_{A3}$ at A3 and energy $E_{A3}$ at A3.

Since the last inlet section $S_{inlet3}$ is a TEE in lieu of a cross in inlet sections $S_{inlet1}$ and $S_{inlet2}$, the energy loss from change of direction from A3 to B3 and change in velocity is calculated from the equation given below.

$$\Delta E_{B3} = \{[1+0.3(V_{B3}/V_{A3})^2][\rho V_{A3}^2/2g_c] + [\rho V_{B3}^2/2g_c]\}/144$$

where $V_{B3}$ and $V_{A3}$ are the respective velocities at B3 and A3.

Energy at B3, $E_{B3} = E_{A3} - \Delta E_{B3}$

From Eq. (4) calculate the pressure $P_{B3}$ at B3.

Repeat step 2 to determine the height of the orifice 65 and area of openings 99 in branches 3A and 3B.

In view of the foregoing, it will be observed that a packed absorption tower having the fluid distribution system of this invention has advantages over prior art systems. For example, the present system eliminates the need for an overhead network of piping, thereby reducing fabrication and installation costs. Also, the unique construction of the troughs of the system ensures a more uniform distribution of fluid to the packing in the tower.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A fluid distribution system for an absorption tower having packing therein, comprising
    a series of troughs adapted to be mounted in the tower above the packing,
    each trough having a bottom wall and a pair of spaced apart side walls,
    an inlet in a side wall of the trough for flow of fluid into the trough,
    ducting for conveying fluid to the inlets of the troughs to fill the troughs with fluid, said ducting comprising a first duct for conveying fluid to the inlet of a first trough in said series of troughs, and a second duct for conveying fluid from an outlet of the first trough to the inlet of a second trough of said series of troughs whereby fluid is conveyed from said first trough to the second trough to fill the two troughs sequentially,
    a flow control system on the inside of each trough adjacent the inlet defining one or more orifices through which fluid may pass to fill the trough,
    a partition extending between the side walls of each trough above the inlet of the trough, the bottom and side walls of the trough combining with said partition to define a conduit for directing the flow of fluid entering the trough to said one or more orifices of the flow control system, and
    a series of downtubes on each trough extending from inside the trough down through the bottom wall of the trough to a location below the trough, each downtube having an inlet disposed inside the trough and an outlet below the trough,
    the arrangement being such that fluid is adapted to pass from said conduit through said one or more orifices and to fill the trough to a level sufficient for fluid to enter the inlets of the downtubes and to flow down the downtubes to said outlets for distribution on said packing.

2. A fluid distribution system as set forth in claim 1 wherein said partition extends substantially the entire length of the trough and divides the trough into an upper chamber above the partition and a lower chamber below the partition, fluid entering through said inlet being adapted to flow into said lower chamber, and openings in the partition spaced at intervals along the trough providing fluid communication between the upper and lower chambers whereby fluid filling the lower chamber is adapted to pass up through said openings into the upper chamber, the inlets of said downtubes being located in the upper chamber of the trough above the partition.

3. A fluid distribution system as set forth in claim 1 wherein said flow control system comprises a gate mechanism extending across the inside of the trough adjacent the inlet of the trough.

4. A fluid distribution system as set forth in claim 3 wherein said gate mechanism comprises a pair of spaced apart gates extending across the inside of the trough on opposite sides of the inlet of the trough.

5. A fluid distribution system as set forth in claim 4 wherein each gate is mounted on the trough for sliding movement in a generally vertical plane to a position in which the gate is spaced above the bottom wall of the trough to define an orifice for the flow of fluid therethrough.

6. A fluid distribution system as set forth in claim 5 wherein the vertical position of the gate is adjustable to vary the size of the orifice.

7. A fluid distribution system as set forth in claim 6 wherein the outlet in said first trough is in a side wall of the first trough generally opposite the inlet of the first trough.

8. A gas absorption tower having packing therein, a gas inlet for delivery of gas into the tower for flow of the gas through the packing, and a fluid distribution system mounted in the tower over the packing for distributing fluid to the packing for flow of the fluid down through the packing, said fluid distribution system comprising
    a series of troughs mounted in the tower above the packing,
    each trough having a bottom wall and a pair of spaced apart side walls,
    an inlet in a side wall of the trough for flow of fluid into the trough,
    ducting for conveying fluid to the inlets of the troughs to fill the troughs with fluid, said ducting comprising a first duct for conveying fluid to the inlet of a first trough in said series of troughs, and a second duct for conveying fluid from an outlet of the first trough to the inlet of a second trough of said series of troughs whereby fluid is conveyed from said first trough to the second trough to fill the two troughs sequentially,
    a flow control system on the inside of each trough adjacent the inlet defining one or more orifices through which fluid may pass to fill the trough,
    a partition extending between the side walls of each trough above the inlet of the trough, the bottom and side walls of the trough combining with said partition to define a conduit for directing the flow of fluid entering the trough to said one or more orifices of the flow control system, and
    a series of downtubes on each trough extending from inside the trough down through the bottom wall of the trough to a location below the trough, each downtube having an inlet disposed inside the trough and an outlet below the trough,
    the arrangement being such that fluid is adapted to pass from said conduit through said one or more orifices and to fill the trough to a level sufficient for fluid to enter the inlets of the downtubes and to flow down the downtubes to said outlets for distribution on said packing.

9. A fluid distribution system as set forth in claim 8 wherein said partition extends substantially the entire length of the trough and divides the trough into an upper chamber above the partition and a lower chamber below the partition, fluid entering through said inlet being adapted to flow into said lower chamber, and openings in the partition spaced at intervals along the trough providing fluid communication between the upper and lower chambers whereby fluid filling the lower chamber is adapted to pass up through said openings into the upper chamber, the inlets of said downtubes being located in the upper chamber of the trough above the partition.

10. A fluid distribution system as set forth in claim 8 wherein said flow control system comprises a gate mechanism extending across the inside of the trough adjacent the inlet of the trough.

11. A gas absorption tower as set forth in claim 10 wherein said gate mechanism comprises a pair of spaced apart gates extending across the inside of the trough on opposite sides of the inlet of the trough.

12. A gas absorption tower as set forth in claim 11 wherein each gate is mounted on the trough for sliding movement in a generally vertical plane to a position in which the gate is spaced above the bottom wall of the trough to define an orifice for the flow of fluid therethrough.

13. A gas absorption tower as set forth in claim 12 wherein the vertical position of the gate is adjustable to vary the size of the orifice.

14. A gas absorption tower as set forth in claim 12 wherein the outlet in said first trough is in a side wall of the first trough generally opposite the inlet of the first trough.

15. A fluid distribution system for an absorption tower having packing therein, comprising a series of troughs adapted to be mounted in the tower above the packing, each trough having a bottom wall and a pair of spaced apart side walls, an inlet in a side wall of the trough for flow of fluid into the trough, ducting for conveying fluid to said inlet to fill the trough with fluid, a flow control system on the inside of each trough adjacent the inlet, said flow control system comprising a pair of generally vertical spaced apart gates extending across the inside of the trough on opposite sides of the inlet, said gates defining orifices through which fluid may pass to fill the trough, a generally horizontal partition extending between the side walls of the trough from one gate to the other above the inlet of the trough, the bottom and side walls of the trough combining with said partition and said gates to direct the flow of fluid entering the trough to and through said orifices, and a series of downtubes on each trough extending from inside the trough down through the bottom wall of the trough to a location below the trough, each downtube having an inlet disposed inside the trough and an outlet below the trough, the arrangement being such that fluid is adapted to pass through said orifices and to fill the trough to a level sufficient for fluid to enter the inlets of the downtubes and to flow down the downtubes to said outlets for distribution on said packing.

16. A gas absorption tower having packing therein, a gas inlet for delivery of gas into the tower for flow of the gas through the packing, and a fluid distribution system mounted in the tower over the packing for distributing fluid to the packing for flow of the fluid down through the packing, said fluid distribution system comprising a series of troughs adapted to be mounted in the tower above the packing, each trough having a bottom wall and a pair of spaced apart side walls, an inlet in a side wall of the trough for flow of fluid into the trough, ducting for conveying fluid to said inlet to fill the trough with fluid, a flow control system on the inside of each trough adjacent the inlet, said flow control system comprising a pair of generally vertical spaced apart gates extending across the inside of the trough on opposite sides of the inlet, said gates defining orifices through which fluid may pass to fill the trough, a generally horizontal partition extending between the side walls of the trough from one gate to the other above the inlet of the trough, the bottom and side walls of the trough combining with said partition and said gates to direct the flow of fluid entering the trough to and through said orifices, and a series of downtubes on each trough extending from inside the trough down through the bottom wall of the trough to a location below the trough, each downtube having an inlet disposed inside the trough and an outlet below the trough, the arrangement being such that fluid is adapted to pass through said orifices and to fill the trough to a level sufficient for fluid to enter the inlets of the downtubes and to flow down the downtubes to said outlets for distribution on said packing.

* * * * *